United States Patent
Blankmeister et al.

(10) Patent No.: US 12,031,474 B2
(45) Date of Patent: Jul. 9, 2024

(54) PRECHAMBER SPARK PLUG HAVING AN OPTIMIZED CAP, AND INTERNAL COMBUSTION ENGINE

(71) Applicant: Robert Bosch GmbH, Stuttgart (DE)

(72) Inventors: Matthias Blankmeister, Heiligenhaus (DE); Stephan Kaske, Sternenfels Diefenbach (DE); Thomas Steidten, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/003,468

(22) PCT Filed: Jun. 23, 2021

(86) PCT No.: PCT/EP2021/067099
§ 371 (c)(1),
(2) Date: Dec. 27, 2022

(87) PCT Pub. No.: WO2022/008242
PCT Pub. Date: Jan. 13, 2022

(65) Prior Publication Data
US 2023/0235695 A1     Jul. 27, 2023

(30) Foreign Application Priority Data
Jul. 8, 2020   (DE) ................... 10 2020 208 578.1

(51) Int. Cl.
*F02B 19/12*      (2006.01)
*F02B 19/18*      (2006.01)

(52) U.S. Cl.
CPC .............. *F02B 19/12* (2013.01); *F02B 19/18* (2013.01)

(58) Field of Classification Search
CPC ........ F02B 19/108; F02B 19/16; F02B 19/165
(Continued)

(56) References Cited

U.S. PATENT DOCUMENTS

| 2013/0206122 A1 | 8/2013 | Chiera et al. |
| 2016/0053670 A1 | 2/2016 | Tozzi et al. |

(Continued)

FOREIGN PATENT DOCUMENTS

| DE | 19714796 A1 | 10/1998 |
| DE | 102011006597 A1 | 3/2012 |

(Continued)

OTHER PUBLICATIONS

International Search Report for PCT/EP2021/067099, Issued Sep. 13, 2021.

*Primary Examiner* — John Kwon
(74) *Attorney, Agent, or Firm* — NORTON ROSE FULBRIGHT US LLP; Gerard A. Messina

(57) ABSTRACT

A prechamber spark plug. The spark plug includes a housing, a cap, which defines a prechamber at least partially, and which includes a plurality of through holes that are configured to produce a connection between the prechamber and a combustion chamber of an internal combustion engine; the through holes each having a hole center line; the cap including a recess at a region pointed towards the housing, the recess abutting the housing at a combustion-chamber-side end of the housing; a distance from an exit point of a through hole lying on the hole center line, to a recess, being in a range of 2 mm to 7 mm; and a first angle between a center axis of the prechamber spark plug and the hole center line being in a range of 30° to 70°. An internal combustion engine including such a prechamber spark plug is also described.

20 Claims, 2 Drawing Sheets

(58) Field of Classification Search
USPC .............................................. 123/594, 169 R
See application file for complete search history.

(56) References Cited

U.S. PATENT DOCUMENTS

| | | |
|---|---|---|
| 2016/0160742 A1 | 6/2016 | Willi et al. |
| 2018/0187590 A1 | 7/2018 | McClendon et al. |
| 2022/0376480 A1* | 11/2022 | Budde .................... H01T 13/54 |
| 2023/0040766 A1* | 2/2023 | Kaske .................... H01T 13/08 |
| 2023/0187909 A1* | 6/2023 | Blankmeister .......... H01T 21/02 |
| | | 313/141 |

FOREIGN PATENT DOCUMENTS

| | | |
|---|---|---|
| DE | 102017107728 A1 | 10/2018 |
| DE | 102018211009 A1 | 1/2020 |
| JP | 2014502692 A | 2/2014 |
| JP | 2019027303 A | 2/2019 |

\* cited by examiner

PRECHAMBER SPARK PLUG HAVING AN OPTIMIZED CAP, AND INTERNAL COMBUSTION ENGINE

FIELD

The present invention relates to a prechamber spark plug having an optimized cap, as well as to an internal combustion engine having such a prechamber spark plug.

BACKGROUND INFORMATION

Different embodiments of prechamber spark plugs are described in the related art. A prechamber of the prechamber spark plug is normally shielded from a combustion chamber of an internal combustion engine by a cap. In this context, a plurality of through holes are provided in the cap, so that on one hand, purging of the prechamber is possible, and on the other hand, after ignition has occurred in the prechamber, torch jets may travel through the through holes into the combustion chamber of the internal combustion engine, in order to ignite a fuel-air mixture located there. Thus, on one hand, it must be ensured that an ignitable mixture is present in the prechamber at the ignition firing point, and on the other hand, it must be ensured that the fuel located in the combustion chamber is burned as completely as possible, in order to satisfy exhaust gas regulations and to optimize fuel consumption of the internal combustion engine.

SUMMARY

A prechamber spark plug of the present invention may have the advantage over the related art that on one hand, highly effective purging of a prechamber of the prechamber spark plug that is in a cap is possible, and on the other hand, it is ensured that an ignitable mixture is present in the prechamber at the ignition firing point of the prechamber spark plug. According to an example embodiment of the present invention, this may be achieved in that the prechamber spark plug includes a housing and a cap possessing at least one through hole having a hole center line. The cap is formed to include a recess, at a region, which points towards the housing. In this connection, a distance A from the hole center line of the through hole, at an exit point on the hole center line directed to the outer side of the through hole, to the recess, is in a range of A=2 mm to 7 mm. In addition, a first angle α between a center axis X-X of the prechamber spark plug and the hole center line is in a range of 30° to 70°. The distance between the exit point on the hole center line and the recess on the cap ensures that in the installed state in a cylinder head, the through hole is not overly near and not overly far away from a cylinder head wall that delimits a combustion chamber of an internal combustion engine. In combination with angle α, it is further ensured that the through hole is well-suited for purging the prechamber in the cap, since angle α is designed to optimize the ingress of purge gas necessary to purge the prechamber.

Preferred further refinements of the present invention are disclosed herein.

Preferably, distance A is in a range of 4 mm to 7 mm and angle α is in a range of 30° to 50°.

It is further preferable for distance A to be in a range of 5 mm to 7 mm and for angle α to be in a range of 30° to 40°.

According to another preferred refinement of the present invention, the respective exit points on the hole center lines of all of the through holes in the cap lie in a common plane E. This allows the prechamber to be purged in a highly effective manner and ensures, in particular, that the prechamber spark plug is also suitable for different geometries of various manufacturers of internal combustion engines. Plane E is preferably perpendicular to center axis X-X of the prechamber spark plug.

According to an example embodiment of the present invention, if the prechamber spark plug is configured to be used in an internal combustion engine, in which tumble flow is generated during the exchange of a charge, one of the through holes of the cap is preferably set up in such a manner, that in the installed state of the prechamber spark plug, a portion of the tumble flow streams directly into the through hole.

According to an example embodiment of the present invention, it is further preferable for the hole center line of the through hole, as well as the beginning of an external thread situated on the housing of the prechamber spark plug, and the center axis X-X of the prechamber spark plug, to be positioned in a common plane. In this manner, it may be ensured that the through hole is situated in a correct position with respect to the beginning of the thread and with respect to the center axis of the prechamber spark plug, in order that when the prechamber spark plug is screwed into a cylinder head, an end position of the through hole, which is intended mainly for letting in the purge gas for the prechamber during the exchange of a charge, allows an optimum purging operation.

The present invention further relates to an internal combustion engine, including a combustion chamber, a piston capable of moving back and forth, as well as an injector for introducing a fuel into the combustion chamber, in particular, directly into the combustion chamber, and a prechamber spark plug according to the present invention. In this context, the internal combustion engine including the prechamber spark plug of the present invention has the corresponding advantages of the prechamber spark plug and allows operation that generates less exhaust gas and optimizes consumption, since, in particular, it is possible to purge the prechamber spark plug in an optimum manner.

According to an example embodiment of the present invention, it is particularly preferable for the internal combustion engine to include an injector, which is configured in such a manner, that a center axis of a spray cone of the injector, which injects into the combustion chamber, is at a second angle β to center axis X-X of the prechamber spark plug, in a range of 30° to 70°. In this context, it is particularly preferable for the center axis of the spray cone to be at an angle β=60°.

According to an example embodiment of the present invention, it is also preferable for a tumble flow to be generated in the combustion chamber during an exchange of charge, in such a manner, that at least a portion of the tumble flow is aimed directly at the through hole of the prechamber spark plug; the through hole being positioned at a distance A and at an angle α to center axis X-X in accordance with the prechamber spark plug of the present invention.

According to an example embodiment of the present invention, it is further preferable for the prechamber spark plug to be positioned substantially centrally, in particular, exactly centrally at the combustion chamber of the internal combustion engine, and for the injector for introducing the fuel to be positioned laterally to the prechamber spark plug. In this context, it is particularly preferable for the injector to be positioned on the cylinder head, between an exhaust valve and the prechamber spark plug. It is also preferable for the piston to be able to have one or more depressions or a protruding dome or the like for generating the tumble flow.

BRIEF DESCRIPTION OF THE DRAWINGS

In the following, a preferred exemplary embodiment of the present invention is described in detail with reference to the figures.

DETAILED DESCRIPTION OF EXAMPLE EMBODIMENTS

In the following, a prechamber spark plug 1 of an internal combustion engine according to a preferred exemplary embodiment of the present invention is described in detail with reference to FIGS. 1 and 2.

Figure 1:
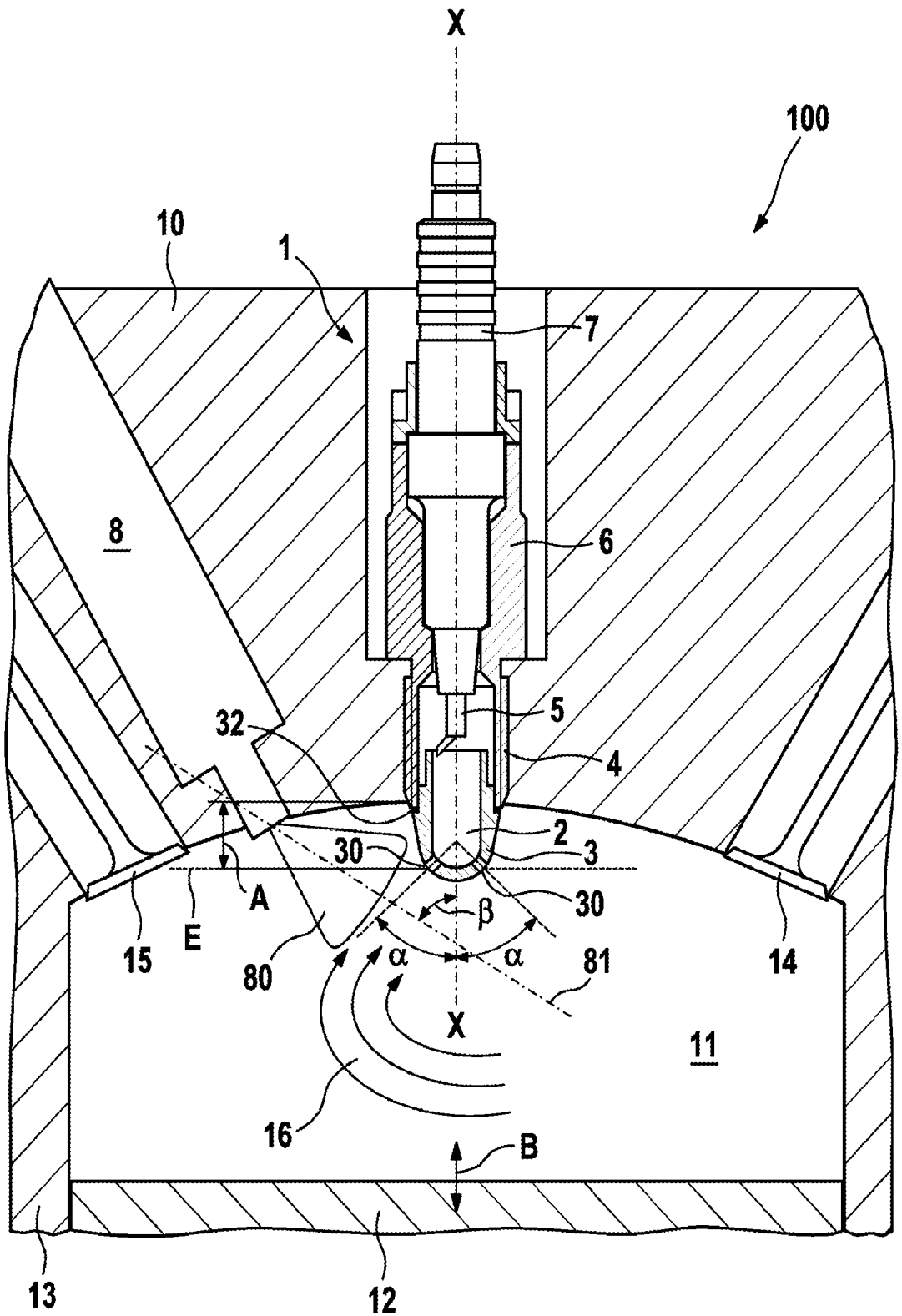
FIG. 1 show a schematic sectional view of an internal combustion engine including a prechamber spark plug according to a preferred exemplary embodiment of the present invention.

As is shown in FIG. 1, prechamber spark plug 1 includes a prechamber 2, which is defined by a cap 3 having a U-shaped section. Cap 3 is fixed to a housing 6 of the prechamber spark plug, for example, with the aid of a welded connection.

In addition, prechamber spark plug 1 includes an electrode 5 and an insulator 7. An external thread is provided at the circumference of housing 6, at an end 60 pointing towards combustion chamber 11. External thread 4 is formed up to the installed cap 3 and is used for fixing prechamber spark plug 1 in a cylinder head 10.

Cap 3 includes a plurality of through holes 30, which are each situated at a first angle α to a center axis X-X of prechamber spark plug 1. Through holes 30 are used, on one hand, to allow purging of prechamber 2 and, on the other hand, to enable, after ignition by electrode 5, a fuel-air mixture to ignite initially within prechamber 2 and then in combustion chamber 11 via through holes 30, with the aid of so-called torch jets. An injector 8, which produces a conical fuel spray 80 in combustion chamber 11, is represented schematically in FIG. 1.

Through hole 30 is a through bore having a stepless diameter.

In addition, a cylinder 13 having a piston 12, which moves back and forth in cylinder 13, as indicated by double arrow B, is shown schematically in FIG. 1. Furthermore, an intake valve 14 and an exhaust valve 15 are provided. In this context, injector 8 is positioned between exhaust valve 15 and prechamber spark plug 1.

Figure 2:
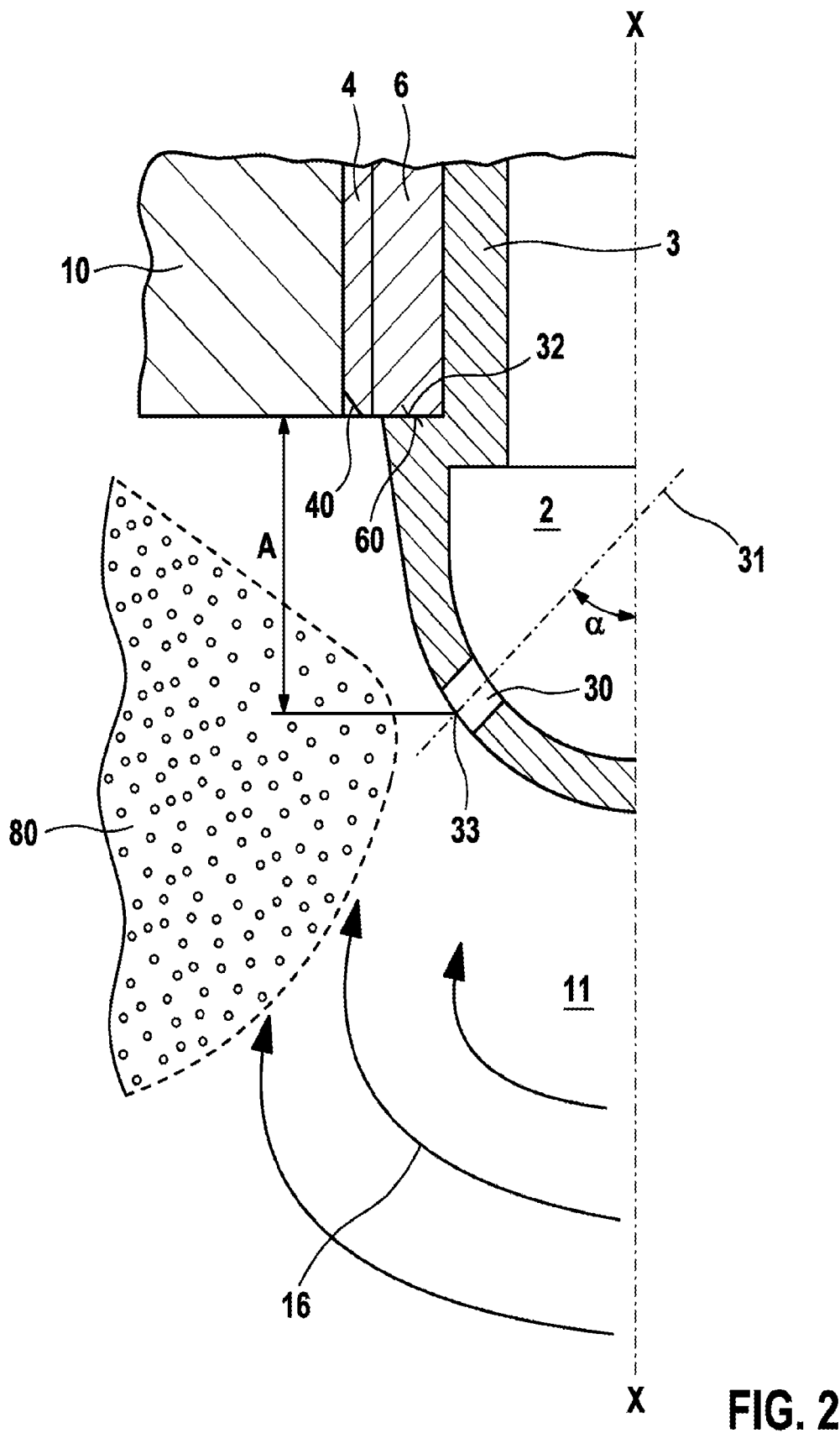
FIG. 2 show a part-sectional view of a cap of the prechamber spark plug of FIG. 1.

As is further shown in FIG. 2, which shows cap 3 of prechamber spark plug 1 in detail, cap 3 includes a radial recess 32 directed inwards. In this context, cap 3 rests against front-side end 60 of housing 6 at recess 32. Fixation may be accomplished, for example, with the aid of a welded connection.

In addition, a hole center line 31 of a through hole 30 is represented in FIG. 2. This through hole 30 shown is one of a plurality of through holes 30 in cap 3 and is situated at the shortest distance from injector 8. Due to that, this through hole 30 is used to allow purging of prechamber 2 during a stroke of the piston, in order to introduce an ignitable mixture into prechamber 2.

As is further shown in FIG. 2, an exit point 33 is defined on hole center line 31; the exit point being situated on the side of through hole 30 pointing towards combustion chamber 11. As already explained above, hole center line 31 determines first angle α. Angle α is preferably in a range of 30° to 50° and is, in this exemplary embodiment, 35°.

As is further shown in FIG. 1, a distance A between exit point 33 and recess 32 in the axial direction of center axis X-X is defined. This distance A is in a range of 2 mm to 7 mm and is, in this exemplary embodiment, 6 mm.

In addition, combustion chamber 11 is geometrically configured in such a manner, that tumble flow 16 is produced in response to movement of piston 12. This tumble flow 16 ensures that exchange of gas between combustion chamber 11 and prechamber 2 is rendered possible, in particular, in order to introduce an ignitable mixture into prechamber 2 again after an occurring ignition. As is apparent from FIG. 2, tumble flow 16 is generated in such a manner, that a portion of tumble flow 16 is aimed directly at through hole 30 of cap 3. Therefore, gas mixture from combustion chamber 11 may be introduced directly through hole 30 into prechamber 2.

In this context, prechamber spark plug 1 is positioned centrally at combustion chamber 11 and, particularly preferably, exactly on a center axis of piston 12.

In addition, hole center line 31 of the through hole 30, which is positioned closest to injector 8, as well as center axis X-X of prechamber spark plug 1, and the beginning 40 of external thread 4, lie in a common plane. This plane is the sectional plane in FIG. 2.

Conical spray 80 produced by injector 8 has a center axis 81. As is apparent from FIG. 1, center axis 81 of conical spray 80 is positioned at a second angle β to the center axis of prechamber spark plug 1. As is further apparent from FIG. 1, in this instance, a center axis of the injector and center axis 81 of conical spray 80 diverge. In this exemplary embodiment, second angle β is 60°.

In addition, all of the through holes 30 of cap 3, which include their respective exit points 33 on their respective hole center lines 31, lie in a common plane E, which is perpendicular to axial direction X-X of the prechamber spark plug.

Consequently, in comparison with the related art, prechamber 2 of prechamber spark plug 1 may be purged more effectively, and an ignitable fuel-air mixture may be introduced more effectively into prechamber 2 in cap 3.

This produces improved ignition within prechamber 2, which results in more rapid combustion of the fuel-air mixture in prechamber 2. Due to the markedly more rapid combustion in prechamber 2, the torch jets may then reach earlier and further into combustion chamber 11 of internal combustion engine 100. This produces more rapid and more effective inflammation of the fuel-air mixture in combustion chamber 11 and results in more rapid and more complete combustion in combustion chamber 11. In this manner, fuel utilization in combustion chamber 11, as well as exhaust gas characteristics of the internal combustion engine, are improved markedly.

In addition, due to the orientation of the through hole 30 situated closest to injector 8, in conjunction with the beginning 40 of external thread 4 of prechamber spark plug 1, exact positioning of this through hole 30 is rendered possible. Exact positioning of the exit points 33 at through holes 30 is achieved by screwing prechamber spark plug 1 completely into cylinder head 10.

What is claimed is:

1. A prechamber spark plug arrangement that includes a prechamber spark plug, the prechamber spark plug comprising:
    a housing; and
    a cap, which defines a prechamber at least partially, and which includes a plurality of through holes that are configured to produce a connection between the prechamber and a combustion chamber of a cylinder of an internal combustion engine, the through holes each having a hole center line;
wherein:
the cap includes a recess at a region forming a surface of the cap that (a) faces towards the housing and that (b) abuts the housing at a combustion-chamber-side end of the housing; and
the prechamber spark plug includes at least one of the following features (I)-(IV):
(I) at least one of the following features (i) and (ii) is provided for one of the through holes:
(i) a distance from (a) an exit point of the one of the through holes that lies on the hole center line of the one of the through holes to (b) the surface of the recess is in a range of 2 mm to 7 mm; and
(ii) the hole center line of the one of the through holes lies on a same plane as (a) a beginning of an external thread of the housing at a combustion-chamber-side end of the housing facing the combustion chamber and (b) a center axis of the prechamber spark plug, when the housing is completely screwed into a cylinder head of the cylinder;
(II) the recess is formed by a radially inward step of an exterior surface of the cap;
(III) the prechamber spark plug is arranged relative to the combustion chamber and to a fuel injector in the cylinder head such that a center axis of a conical spray of fuel, when generated by the fuel injector into the combustion chamber, is, relative to the center axis of the prechamber spark plug, at an angle that is within a range of 30° to 70°; and
(IV) the through holes are oriented relative to the combustion chamber such that a direction of a stream of a tumble flow of the fuel, generated by a movement of a piston in the cylinder, is parallel to and in line with the hole center line of at least one of the through holes for direct reception therein of the stream.

2. The prechamber spark plug arrangement as recited in claim 1, wherein the distance from (a) the exit point of the one of the through holes that lies on the hole center line of the one of the through holes to (b) the surface of the recess is in a range of 4 mm to 7 mm, and an angle between the center axis of the prechamber spark plug and the hole center lines is in a range of 30° to 50°.

3. The prechamber spark plug arrangement as recited in claim 1, wherein the one of the through holes is closest of all of the through holes to the conical spray, and the distance from (a) the exit point of the one of the through holes that lies on the hole center line of the one of the through holes to (b) the surface of the recess is in the range of 2 mm to 7 mm.

4. The prechamber spark plug arrangement as recited in claim 1, wherein respective exit points of all of the through holes are situated in a common plane, each of the exit points lying on respective one of the hole center lines.

5. An internal combustion engine, comprising:
a cylinder having therein a combustion chamber;
a piston configured to move back and forth;
an injector configured to introduce a fuel into the combustion chamber; and
a prechamber spark plug including:
a housing; and
a cap, which defines a prechamber at least partially, and which includes a plurality of through holes that are configured to produce a connection between the prechamber and the combustion chamber of the cylinder, the through holes each having a hole center line;
wherein:
the cap includes a recess at a region forming a surface of the cap that (a) faces towards the housing and that (b) abuts the housing at a combustion-chamber-side end of the housing; and
the prechamber spark plug includes at least one of the following features (I)-(IV):
(I) at least one of the following features (i) and (ii) is provided for one of the through holes:
(i) a distance from (a) an exit point of the one of the through holes that lies on the hole center line of the one of the through holes to (b) the surface of the recess is in a range of 2 mm to 7 mm; and
(ii) the hole center line of the one of the through holes lies on a same plane as (a) a beginning of an external thread of the housing at a combustion-chamber-side end of the housing facing the combustion chamber and (b) a center axis of the prechamber spark plug, when the housing is completely screwed into a cylinder head of the cylinder;
(II) the recess is formed by a radially inward step of an exterior surface of the cap;
(III) the prechamber spark plug is arranged relative to the combustion chamber and to the injector in the cylinder head such that a center axis of a conical spray of fuel, when generated by the injector into the combustion chamber, is, relative to the center axis of the prechamber spark plug, at an angle that is within a range of 30° to 70°; and
(IV) the through holes are oriented relative to the combustion chamber such that a direction of a stream of a tumble flow of the fuel, generated by the movement of the piston in the cylinder, is parallel to and in line with the hole center line of at least one of the through holes for direct reception therein of the stream.

6. The internal combustion engine as recited in claim 5, wherein the prechamber spark plug is arranged relative to the combustion chamber and to the fuel injector in the cylinder head such that the center line axis of the conical spray of fuel, when generated by the fuel injector into the combustion chamber, is, relative to the center axis of the prechamber spark plug, at the angle that is within the range of 30° to 70°, the angle being approximately 60°.

7. The internal combustion engine as recited in claim 5, wherein the prechamber spark plug is positioned substantially centrally at the combustion chamber, and the injector is positioned laterally to the prechamber spark plug, at the combustion chamber.

8. The internal combustion engine as recited in claim 5, wherein the distance from (a) the exit point of the one of the through holes that lies on the hole center line of the one of the through holes to (b) the surface of the recess is in the range of 2 mm to 7 mm.

9. The internal combustion engine as recited in claim 5, wherein the hole center line of the one of the through holes lies on the same plane as (a) the beginning of the external thread of the housing at the combustion-chamber-side end of the housing facing the combustion chamber and (b) the center axis of the prechamber spark plug, when the housing is completely screwed into the cylinder head of the cylinder.

10. The internal combustion engine as recited in claim 5, wherein the recess is formed by a radially inward step of an exterior surface of the cap.

11. The internal combustion engine as recited in claim 10, wherein, due to the step, a radial extension of a first axial region of the cap is larger than a second axial region of the cap that is more distal from the combustion chamber than the first axial region of the cap.

12. The internal combustion engine as recited in claim 5, wherein the prechamber spark plug is arranged relative to the combustion chamber and to the fuel injector in the cylinder head such that the center line axis of the conical spray of fuel, when generated by the fuel injector into the combustion chamber, is, relative to the center axis of the prechamber spark plug, at the angle that is within the range of 30° to 70°.

13. The internal combustion engine as recited in claim 5, wherein the through holes are oriented relative to the combustion chamber such that the direction of the stream of the tumble flow of the fuel, generated by the movement of the piston in the cylinder, is parallel to and in line with the hole center line of the at least one of the through holes for direct reception therein of the stream.

14. The prechamber spark plug arrangement as recited in claim 1, wherein the distance from (a) the exit point of the one of the through holes that lies on the hole center line of the one of the through holes to (b) the surface of the recess is in the range of 2 mm to 7 mm.

15. The prechamber spark plug arrangement as recited in claim 14, wherein the distance is in a range of 5 mm to 7 mm, and an angle between the center axis of the prechamber spark plug and the hole center lines is in a range of 30° to 40°.

16. The prechamber spark plug arrangement as recited in claim 1, wherein the hole center line of the one of the through holes lies on the same plane as (a) the beginning of the external thread of the housing at the combustion-chamber-side end of the housing facing the combustion chamber and (b) the center axis of the prechamber spark plug, when the housing is completely screwed into the cylinder head of the cylinder.

17. The prechamber spark plug arrangement as recited in claim 1, wherein the recess is formed by a radially inward step of an exterior surface of the cap.

18. The prechamber spark plug arrangement as recited in claim 17, wherein, due to the step, a radial extension of a first axial region of the cap is larger than a second axial region of the cap that is more distal from the combustion chamber than the first axial region of the cap.

19. The prechamber spark plug arrangement as recited in claim 1, wherein the prechamber spark plug is arranged relative to the combustion chamber and to the fuel injector in the cylinder head such that the center line axis of the conical spray of fuel, when generated by the fuel injector into the combustion chamber, is, relative to the center axis of the prechamber spark plug, at the angle that is within the range of 30° to 70°.

20. The prechamber spark plug arrangement as recited in claim 1, wherein the through holes are oriented relative to the combustion chamber such that the direction of the stream of the tumble flow of the fuel, generated by the movement of the piston in the cylinder, is parallel to and in line with the hole center line of the at least one of the through holes for direct reception therein of the stream.

\* \* \* \* \*